June 23, 1970 A. M. KARP 3,517,261
FLASHER CIRCUIT
Filed Sept. 27, 1968
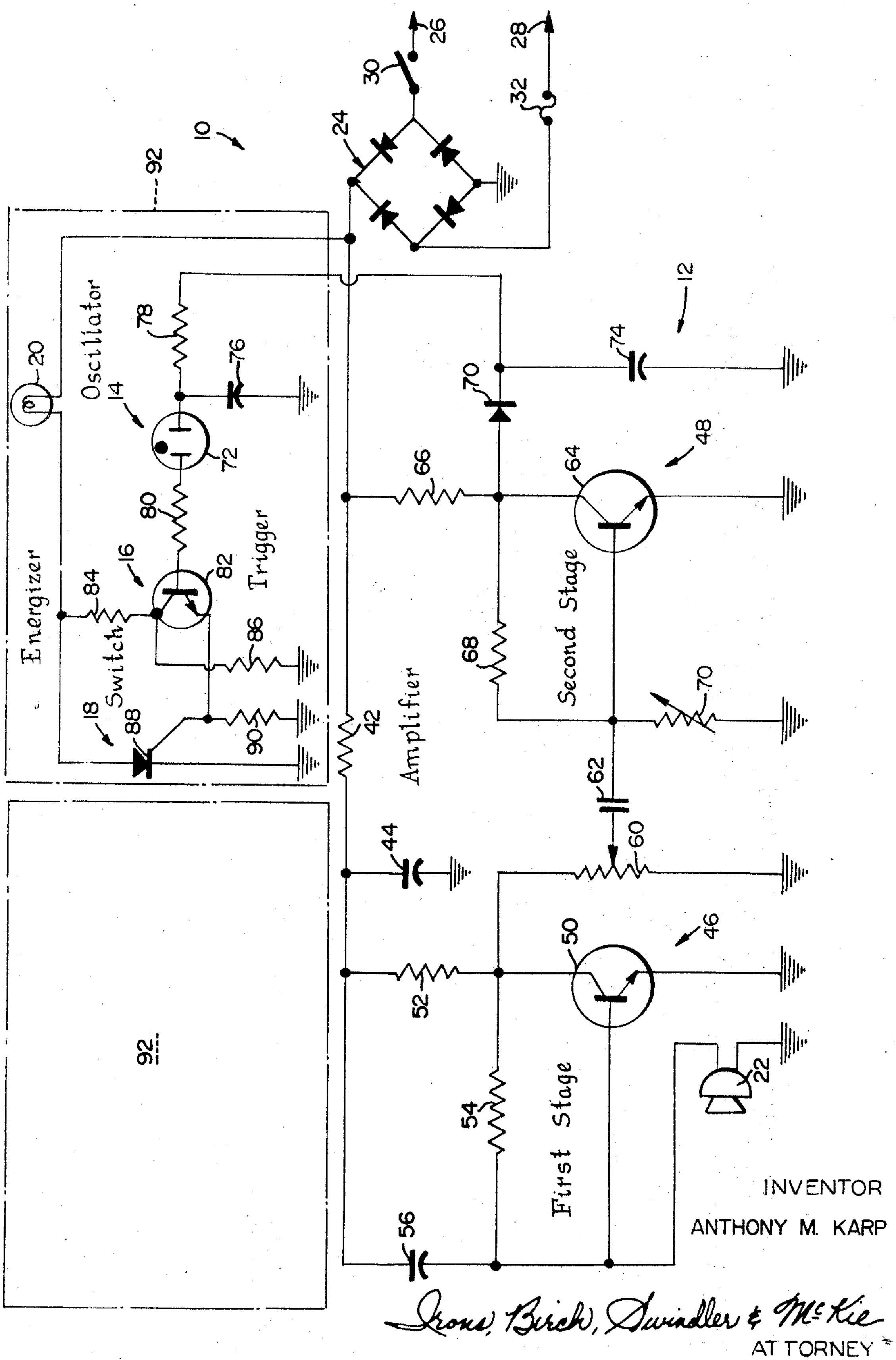
INVENTOR
ANTHONY M. KARP
Irons, Birch, Swindler & McKie
ATTORNEY

United States Patent Office 3,517,261
Patented June 23, 1970

3,517,261
FLASHER CIRCUIT

Anthony M. Karp, New York, N.Y., assignor to William B. Birch, New York, N.Y.

Filed Sept. 27, 1968, Ser. No. 763,320
Int. Cl. H05b 37/00, 39/00, 41/14
U.S. Cl. 315—241 6 Claims

ABSTRACT OF THE DISCLOSURE

A circuit for flashing an electric lamp on and off in response to variations in the amplitude of a control signal.

BACKGROUND AND SUMMARY OF THE INVENTION

This invention relates to flasher circuits, and more particularly to a circuit which repeatedly energizes and de-energizes one or more electric lamps in response to variations in the amplitude of a control signal, preferably an audio frequency signal.

Various circuits have been designed for repeatedly energizing and de-energizing an electric lamp in response to variations in an externally generated signal. The present invention embodies an improved circuit of this type, and is specifically designed to flash one or more electric lamps on and off as a function of variations in the amplitude of an audio frequency control signal.

The control signal may be generated by any conventional audio frequency source such as a microphone, record player, radio, or the like. When the amplitude of the control signal exceeds a predetermined minimum level, the lamp or lamps controlled by the circuit of the invention are repeatedly energized and de-energized. To achieve this result the circuit employs an oscillating means which is operative to energize the lamps when the amplitude of the control signal reaches a predetermined minimum level, and which is operative to flash the lamps on and off at a rate which is proportional to the amplitude of the control signal above the predetermined minimum level.

It is an object of the present invention to provide a circuit for flashing one or more electric lamps on and off in response to variations in the amplitude of a control signal.

It is also an object of the invention to provide a flasher circuit having an oscillating means which is operative to flash one or more electric lamps on and off at a rate which is proportional to the amplitude of an externally generated control signal.

These and other objects of the invention will become apparent upon a consideration of the detailed description of a preferred embodiment thereof given in connection with the single figure of drawings; wherein is shown a schematic diagram of the circuit of the invention.

DESCRIPTION OF THE PREFERRED EMBODIMENT

A preferred embodiment of the circuit of the invention is designated in the drawings by reference numeral 10, and generally comprises an amplifying means 12, an oscillating means 14, a triggering means 16 and a switching means 18. Circuit 10 is designed to flash one or more electric lamps 20 on and off in response to variations in the amplitude of an externally generated audio frequency control signal.

The control signal conveniently may be generated by a high impedance audio frequency source, such as microphone 22. Alternatively, the control signal may be generated by a low impedance audio frequency source, such as a record player, radio or the like. When the control signal is generated by a low impedance source, the source is connected to circuit 10 by a suitable impedance matching audio transformer and alternating current coupling capacitor.

The power supply for circuit 10 comprises a full wave bridge rectifier 24 which is connected across a source of conventional alternating current by leads 26 and 28. A switch 30 and a current-limiting fuse 32 are interposed between rectifier 24 and the source of alternating current for respectively controlling the energization of circuit 10 and protecting the circuit from current overloads. The negative terminal of rectifier 24 is connected to the system ground, and the positive terminal is connected to amplifying means 12 and lamp 20.

Amplifying means 12 includes a filter, comprising, for example, a resistor 42 and a capacitor 44, for smoothing out the pulsating direct current produced by rectifier 24.

Amplifying means 12 also includes a first amplifier stage 46 and a second amplifier stage 48; both of which are grounded-emitter NPN transistor amplifiers. First stage 46 comprises an NPN transistor 50, resistors 52 and 54 and a capacitor 56. Resistor 52 is the load resistor for transistor 50, and resistor 54 determines the operating voltage and provides thermal stability for the transistor. Capacitor 56 is a high frequency, i.e. radio frequency, shunt which prevents extraneous high frequency signals from interfering with the biasing of transistor 50. Microphone 22 is connected to the base of transistor 50 for applying the audio frequency control signal to first stage 46.

The output from first stage 46 passes through an adjustable intensity control means, comprising a potentiometer 60 and an alternating current coupling capacitor 62.

Second stage 48 comprises an NPN transistor 64, a load resistor 66, a fixed resistor 68 and a variable resistor 70. The latter two resistors determine the operating voltage and provide thermal stability for transistor 64. Capacitor 62 is connected to the base of transistor 64 for applying the output of first stage 46 to second stage 48.

The output from second stage 48 passes through a diode 70 to oscillating means 14, which conveniently comprises a gas-filled tube 72, a capacitor 76 and a resistor 78. As will be apparent oscillating means 14 is a relaxation oscillator which is responsive to the amplitude of the output from second stage 48. Interposed between second stage 48 and oscillating means 14 is an oscillator charging capacitor 74.

Oscillating means 14 is connected to triggering means 16. The triggering means conveniently comprises an NPN transistor 82 and resistors 84 and 86. The base of transistor 82 is connected to tube 72 by a resistor 80 for receiving the saw tooth output of oscillating means 14. Resistors 84 and 86 comprise a voltage divider, the mid point of which is connected to the collector of transistor 82.

The emitter of transistor 82 is connected to the gate of switching means 18 which conveniently comprises a unidirectional thyristor, such as silicon controlled rectifier 88. The gate network for rectifier 88 includes a resistor 90 which stabilizes the gating of the rectifier. As will be apparent, transistor 82 comprises an emitter-follower gating trigger for rectifier 88 which matches the high impedance of tube 72 to the low impedance of the rectifier.

The anode and cathode of rectifier 88 are connected in a series network with lamp 20 and the positive terminal of bridge rectifier 24. Thus, when tube 72 is biased into a conducting state, rectifier 88 will also be biased into a conducting state and current will flow through lamp 20.

When the potential applied across tube 72 is insufficient to maintain the tube in a conducting state, the gate network for rectifier 88 will be de-energized, permitting rectifier 88 to commutate when the pulsating direct current from bridge rectifier 24 reaches zero voltage.

The oscillation frequency of oscillating means 14, and thus the rate at which lamp 20 is flashed on and off are dependent upon the R-C time constant of resistor 78 and capacitor 76, and the amplitude of the output of second amplifier stage 48. Thus, for a fixed value resistor 78 and a fixed value capacitor 76 the rate which lamp 20 is flashed on and off is dependent solely upon the output of second stage 48.

Initially resistor 70 is adjusted so that in the quiescent condition, i.e. no control signal being applied to first stage 46 from microphone 22, the output from second stage 48 is insufficient to bias tube 72 into a conducting state. Potentiometer 60 is thereafter adjusted so that the control signal must reach a predetermined minimum amplitude before the output from second stage 48 is sufficient to bias tube 72 into a conducting state. As the amplitude of the control signal increases above this predetermined minimum level, and thus the output from second stage 48 increases above the minimum conduction voltage of tube 72, the oscillation frequency of oscillating means 14 will increase. As will thus be apparent, the on and off flash rate of lamp 20 is proportional to the amplitude of the control signal generated by microphone 22 above a predetermined minimum level.

Once tube 72 has been biased into a conducting state, the tube presents a low resistance to the charge stored on capacitor 76. Therefore, in the absence of resistor 80, tube 72 would remain in a conducting state for an extremely short time period, unless capacitor 78 were a relatively expensive electrolytic capacitor having the capability of storing a large charge. This expense is avoided by the use of resistor 80 which impedes the discharge of capacitor 76 and therefore prolongs the time period during which tube 72 remains in a conducting state even though capacitor 76 may be a relatively inexpensive paper, mica or ceramic capacitor.

If desired, instead of a single lamp 20 a plurality of lamps may be flashed on and off by circuit 10. In such instance, a single amplifying means 12 may be employed and the output therefrom applied to a plurality of lamp energizing means 92; each such energizing means including an oscillating means 14, a triggering means 16 and a switching means 18. When a plurality of energizing means 92 are employed, the associated lamps desirably are of different colors to produce a more varied visual effect. Also, if desired, a frequency discriminator (not shown) may be interposed between amplifying means 12 and each of the energizing means 92 so that only selected ones of the lamps will be energized at different frequencies.

Circuit 10, in addition to providing an ideal means for flashing one or more lamps on and off to provide a pleasing visual effect, also may be employed as a visual indicator for measuring amplitude variations in a control signal. Also, the device may be employed in a stroboscopic instrument for measuring the synchronization between an external condition and variations in the amplitude of a control signal.

While the foregoing constitutes a detailed description of a preferred embodiment of the invention it is understood that various modifications thereof will occur to those skilled in the art. Therefore, the scope of the invention is to be limited solely by the scope of the claims appended hereto.

I claim:

1. A circuit for flashing an electric lamp on and off in response to variations in the amplitude of a control signal comprising:
- an amplifying means adapted to receive and amplify said control signal;
- an oscillating means connected to said amplifying means and being operative to oscillate at a frequency proportional to the amplitude of said control signal;
- a triggering means connected to said oscillating means and being operative to generate triggering pulses responsive to and at the same frequency as the oscillation frequency of the oscillating means; and
- a gate-controlled switching means adapted to be connected in series with said lamp and a source of electrical power, and having a gate connected to said triggering means, said switching means being operative to close when a triggering pulse is present at said gate and being operative to open when no triggering pulse is present at said gate so that the lamp will be flashed on and off at a rate proportional to the amplitude of the control signal.

2. A circuit as recited in claim 1, wherein said amplifying means comprises a first amplifier stage adapted to receive said control signal, a second amplifier stage connected to said first stage and an adjustable intensity control means interposed between said first and second stages for regulating the amplitude of the input to said second stage.

3. A circuit as recited in claim 2, wherein said second amplifier stage includes means for adjusting the amplitude of the output thereof independently of said control means.

4. A circuit as recited in claim 1, wherein said oscillating means includes a gas-filled tube which is biased into a conducting state during each cycle of the oscillating means.

5. A circuit as recited in claim 4, further comprising a resistor interposed between said oscillating and said triggering means for prolonging the time period during which said tube remains in a conducting state.

6. A circuit as recited in claim 1, wherein said switching means comprises a unidirectional thyristor.

References Cited

UNITED STATES PATENTS

| | | | |
|---|---|---|---|
| 3,258,758 | 6/1966 | Byrd | 340—228 |
| 3,456,129 | 7/1969 | Burnett et al. | 307—261 |
| 3,460,126 | 8/1969 | Spofford | 340—253 |
| 3,316,445 | 4/1967 | Ahrons | 315—183 |
| 3,355,626 | 11/1967 | Schmidt | 315—241 |
| 3,397,344 | 8/1968 | Skirpan | 315—194 |
| 3,440,517 | 4/1969 | Page et al. | 321—18 |

JOHN W. HUCKERT, Primary Examiner

S. BRODER, Assistant Examiner

U.S. Cl. X.R.

315—200, 207, 245; 340—253